United States Patent [19]

Baudequin et al.

[11] Patent Number: 4,707,350
[45] Date of Patent: Nov. 17, 1987

[54] PROCESS AND DEVICE FOR THE DECARBONATION OF MINERALS BY FLUIDIZED BED CALCINATION

[75] Inventors: Francois Baudequin, Eaubonne; Patrick Leclere, Jouy Le Moutier, both of France

[73] Assignee: Electricite de France - Service National, Paris, France

[21] Appl. No.: 779,754

[22] Filed: Sep. 24, 1985

[30] Foreign Application Priority Data

Sep. 24, 1984 [FR] France ................. 84 14622

[51] Int. Cl.$^4$ ............................................. C01B 13/14
[52] U.S. Cl. .................................... 423/637; 423/175;
423/177; 423/DIG. 6; 423/DIG. 16;
165/104.16; 34/57 A
[58] Field of Search ............... 423/635, 637, 175, 173,
423/437, 438, DIG. 6, DIG. 10, DIG. 16, 177;
165/104.16; 34/57 A

[56] References Cited

U.S. PATENT DOCUMENTS

| 2,637,545 | 5/1953 | Hicquet | 423/637 |
| 2,738,182 | 3/1956 | Thompson | 423/637 |
| 2,772,950 | 12/1956 | Rahn et al. | 423/637 |
| 2,774,661 | 12/1956 | White | 423/175 |
| 3,332,870 | 7/1967 | Orbach et al. | 423/DIG. 10 |
| 3,595,541 | 7/1971 | Pabich et al. | 423/637 |
| 3,783,167 | 1/1974 | Tylko | 373/23 |
| 3,796,791 | 3/1974 | Nielsen et al. | 423/175 |
| 3,829,391 | 8/1974 | Chen et al. | 423/637 |
| 3,862,294 | 1/1975 | Engelhart et al. | 423/175 |
| 4,076,796 | 2/1978 | Reh et al. | 423/637 |
| 4,321,239 | 3/1982 | Bildjukevich et al. | 423/637 |
| 4,389,381 | 6/1983 | Dinovo | 423/637 |
| 4,483,831 | 11/1984 | Schmidt et al. | 423/637 |

FOREIGN PATENT DOCUMENTS

| 1024340 | 3/1953 | France | 423/637 |
| 84/03691 | 9/1984 | PCT Int'l Appl. | 423/175 |
| 0251381 | 8/1948 | Switzerland | 423/637 |

Primary Examiner—Andrew Metz
Assistant Examiner—Anthony McFarlane
Attorney, Agent, or Firm—Sughrue, Mion, Zinn, Macpeak & Seas

[57] ABSTRACT

The invention relates to a process for the decarbonation of minerals, in powdered form, in a fluidized bed. For example, the process applies to the production of quick lime and/or magnesia from lime stone and/or dolomite fines which are not rendered sufficiently valuable at present.

The process comprises recycling a portion at least of the carbon dioxide produced to be used as sole fluidizing gas, the fluidized bed being heated to the desired decarbonation temperature by direct heat supply within the fluidized bed by means of electric devices.

Production of decarbonated minerals and of $CO_2$.

2 Claims, 1 Drawing Figure

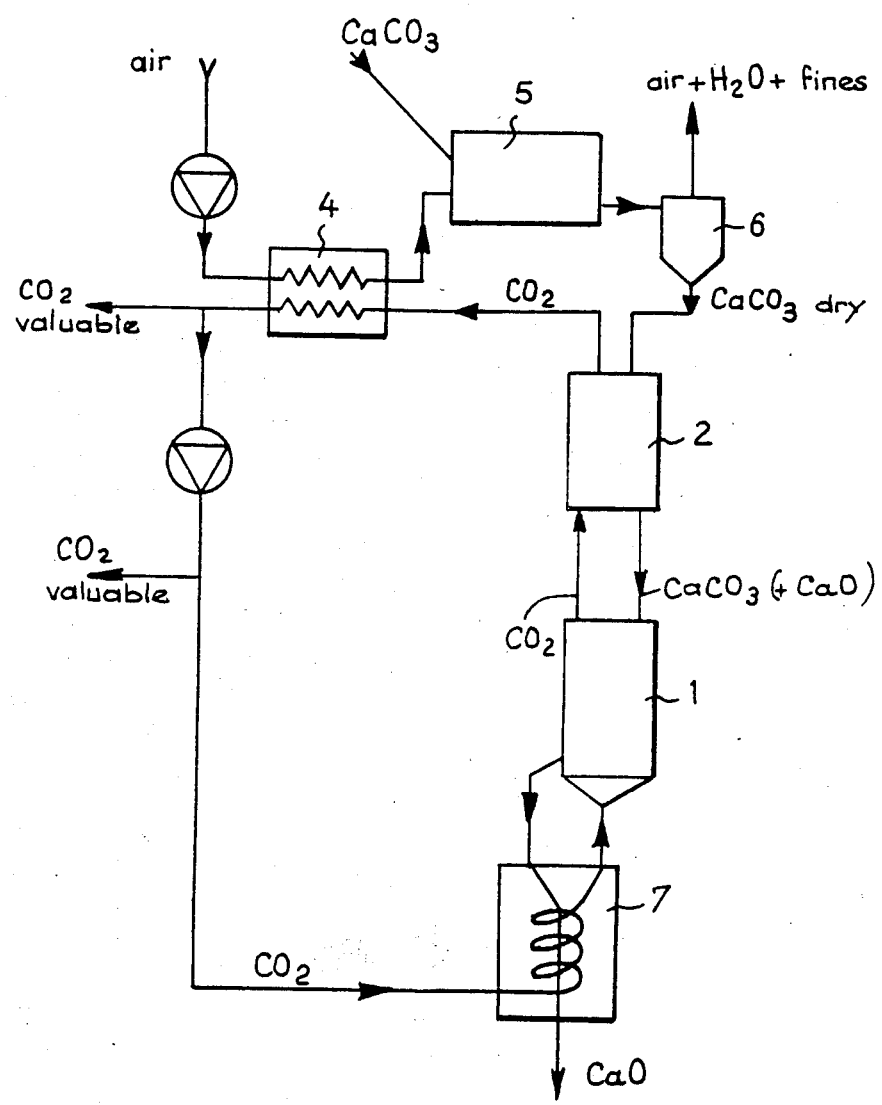

PROCESS AND DEVICE FOR THE DECARBONATION OF MINERALS BY FLUIDIZED BED CALCINATION

This invention relates to a process and a device for the decarbonation of minerals, typically of lime stone, by fluidized bed calcination.

The decarbonation of minerals requires generally a large amount of heat, due to the fact that such reactions are highly endothermic. Therefore, it had frequently been suggested to use it in combination with exothermic reactions, for example with the combustion of organic materials (such as disclosed in FR-A-1 024 340). However, the various carbonates do not all decompose with the same readiness when heated to the same temperature. Moreover, the use of additional materials complicates the control of the decarbonation reaction and is prejudicial to the purity of the products produced.

This invention provides a new process and device which permit a greater energy savings and, additionally, the production of highly pure valuable carbon dioxide.

Thefore, this invention concerns a process for the decarbonation of minerals (this term designating in particular all the rocks or minerals commonly used industrially) in the form of fine particles in a fluidized bed, process wherein a portion at least of the carbon dioxide produced is recycled to be used as sole fluidizing gas, the fluidized bed being heated to the desired decarbonation temperature by direct heat supply within the fluidized bed by means of electric devices.

In this invention, the term "fine particles" designates particles having a size from 50 microns to 1 mm.

This invention provides also a device for the implementation of said process, comprising a fluidized bed decarbonation reactor provided with electric heating means for heating the reactor within the fluidized bed, and with means for recycling the carbon dioxide produced as sole fluidizing gas.

The fluidized bed may indifferently consist of a simple or circulating bed, or also of an entrained bed analogous to a pneumatic conveyor. It may be of isothermal or thermal gradient type, of homogeneous or segregation type. Its design may be of silo, tunnel or multistage type.

According to this invention, the heat supply required for the reaction is of electric origin and is provided within the fluidized bed. Said heat supply may typically be effected by means of electric resistances immersed in the fluidized bed. Said resistances may consist of so-called immersion heater units, particularly of units made of silicon carbide or graphite and including a refractory sheath. As a modification, one may also provide for direct conduction within the fluidized medium, or use other methods such as dielectric or micro-wave heating.

BRIEF DESCRIPTION OF THE DRAWINGS

The disclosed drawing is a schematic representation of the disclosed invention.

The temperature within the fludized bed is advantageously set between the minimum decarbonation temperature at atmospheric pressure and the clinkering temperature. In the particular case of lime production, the temperature of the fluidized bed will be set between 900° and 1000° C. (the temperature of the heating units being set at a level about 200° C. above the temperature of the bed), in order to obtain a highly reactive, unclinkerized lime, without having to resort to heating units of excessive surface.

The fluidizing gas and the gas provided by the decarbonation ($CO_2$ in both cases) leave the reactor and are separated from the unavoidable flying dust particles in a reheater, of cyclone type, for example. After separation, the powders are, as far as possible, reinjected into the reactor while, in the reheater, the incoming material (carbonated mineral) is reheated by means of the $CO_2$ at high temperature and, if possible, submitted to incipient decarbonation prior its introduction into the reactor. Alternatively, the reheater may be used in the form of a fluidized bed, particularly of thermal gradient type, such as a tunnel type fluidized bed.

When, at the inlet of the process, the material is not available in sufficiently dry condition and/or does not have the desired particle size for the technology required by the reactor, the process comprises adding a process head device comprising a $CO_2$-air (separate flow) heat-exchanger, a grinder/dryer for the incoming material (carbonated mineral) and a powder separator. The air may be introduced into said device by known means, a fan, for example. This re-heated air is blown into the grinder/dryer for the incoming material where it plays the twofold role of pneumatic carrier air and of drying air. At the outlet of the grinder/dryer, the mineral is separated from the air, from the drying steam and, optionally, from the valueless ultra-fines in a gas-powder separator, typically a cyclone. Thus, the carbonate-containing mineral enters the reheater in anhydrous powdered form. The carbon dioxide leaving the reheater for the incoming material, or, as the case may be, leaving the $CO_2$-air heat-exchanger, is partly drawn and may optionally be used, while the undrawn portion is recycled to the reactor as fluidizing gas.

The arrangement may also include another $CO_2$-reaction products heat-exchanger, with separated or unseparated flows, serving to reheat the carbon dioxide recycled to the reactor and to cool the reaction products leaving the reactor. Said exchanger may typically be designed in a manner related to that of a clinker- or particle rain-cooler. In view of the fact that the $CO_2$ is introduced at a temperature close to ambient (particularly when coming out of the $CO_2$-air exchanger), the sensible heat of the reaction products may be exhausted and totally, or almost so, recovered for reheating the $CO_2$. This makes it possible to minimize or even to omit the final cooler, prior to packing the decarbonated mineral for use or storage.

The chief advantages of the process and device of this invention are:

production of a highly reactive powdered decarbonated material, such as lime or magnesia, for example;

ready usefulness of the $CO_2$ provided by the decarbonation, due to its high purity (it is practically the sole gas present in the process);

very good energy efficiency of the equipment (the recycling of the $CO_2$ and the cooling thereof to a temperature close to ambient reduce greatly the sensible heat losses);

the electric heating of the reactor provides a highly pure decarbonated product, free from any traces of inert materials or of undesirable bodies usually contained in fuels (sulfur, nitrogen, potash, heavy metals, and the like):

the precision of electric heating control strongly reduces the risks for the clinkering of the product, and provides a valuable product of "fine chemical" grade;

the versatility of the process permits contemplating implementations within the range from several hundred kW to over 20 MW of installed capacity, and facilitates and accelerates the shutdown and start-up procedures of the process.

The following description, given in conjunction with the single accompanying figure, given as non limiting example, will provide a better understanding of the manner in which the invention may be carried out.

In the diagram of the process and device given in the figure, castine (20.9 t/h) having a humidity rate of 6% enters a grinder/dryer 5 in which it is ground to a particle size within the range from 100 to 400 μm and is dried by means of air heated in heat-exchanger 4, after which the dried castine is led to cyclone 6 where the drying air, the steam and the ultra-fines (dusts) are extracted from the process at 120° C. The dust losses represent about 10% of the dry product. The dried castine (17.86 t/h) leaves the head device (comprising apparatus 4, 5, 6) and enters the preheating-predecarbonation device represented by reheater 2, comprising three cyclones in which the $CO_2$ from reactor 1 gives up its sensible heat to the lime stone and is separated from the lime stone.

Once reheated and pre-decarbonated, the limestone enters reactor 1, as a fluidized bed (about 3 m diameter and 4 m high), electrically heated (1115 kWh/t of lime) by means of silicon carbide resistances thermostated at 1150° and immersed in the bed, maintained at a temperature of about 950° C. The pressure loss of the fluidizing grate and of the dense phase of the fluidized bed is 0.5 bar (50 kPa).

The powdered and highly reactive quick lime (about 10 t/h) is extracted from the fluidized bed and cooled in the $CO_2$-CaO heat-exchanger 7 (separate flows) where it gives up a portion of its heat to the fluidizing carbon dioxide which enters reactor 1 at a temperature close to that of the fluidized bed, thus preventing additional power consumption.

The $CO_2$ from the fluidization and produced by the decarbonation leaves reactor 1 for reheater 2, where it loses a portion of its heat given up to the limestone, and is then sent to $CO_2$-air heat-exchanger 4 (separate flows and counter-currently) where it is cooled to a temperature of about 40° C. The thus cooled $CO_2$ is put in motion by a device known per se, typically a booster, and carbon dioxide from the decarbonation is drawn off at a point of the device between the outlet of the air/$CO_2$ exchanger 4 and the inlet to the $CO_2$/CaO exchanger 7.

This withdrawal of $CO_2$ is effected in a very simple manner, for example by means of a valve associated with a pressure control, for example within the reactor. When the pressure of the reactor increases, an increased amount of $CO_2$ must be withdrawn, and vice-versa.

This withdrawal may usefully be connected with a device of the process used for packaging the $CO_2$ for future valuable use, for example an equipment for the liquefaction of $CO_2$. The unwithdrawn $CO_2$ is recycled to reactor 1, after prior passage through exchanger 7.

We claim:

1. In a process for the decarbonation of carbonated minerals in the form of fine particles with production of carbon dioxide in a fluidized bed, wherein the improvement comprises that a portion at least of the carbon dioxide produced is recycled as carbon dioxide gas of high purity to be used as sole fluidizing gas of said mineral particles, with the fluidized bed being heated to maintain a temperature between the incipient decarbonation temperature and the clinkering temperature by direct heat supply within the fluidized bed by means of electric resistances immersed in the fluidized bed.

2. Process as claimed in claim 1, wherein calcium carbonate is decarbonated and the temperature within the fluidized bed is set at a value from 900° to 1000° C.

* * * * *